Dec. 29, 1931.  F. W. LEE  1,838,315
MAGNETIC SATURATION CONTROL OF ELECTRIC CIRCUITS
Filed Nov. 12, 1927
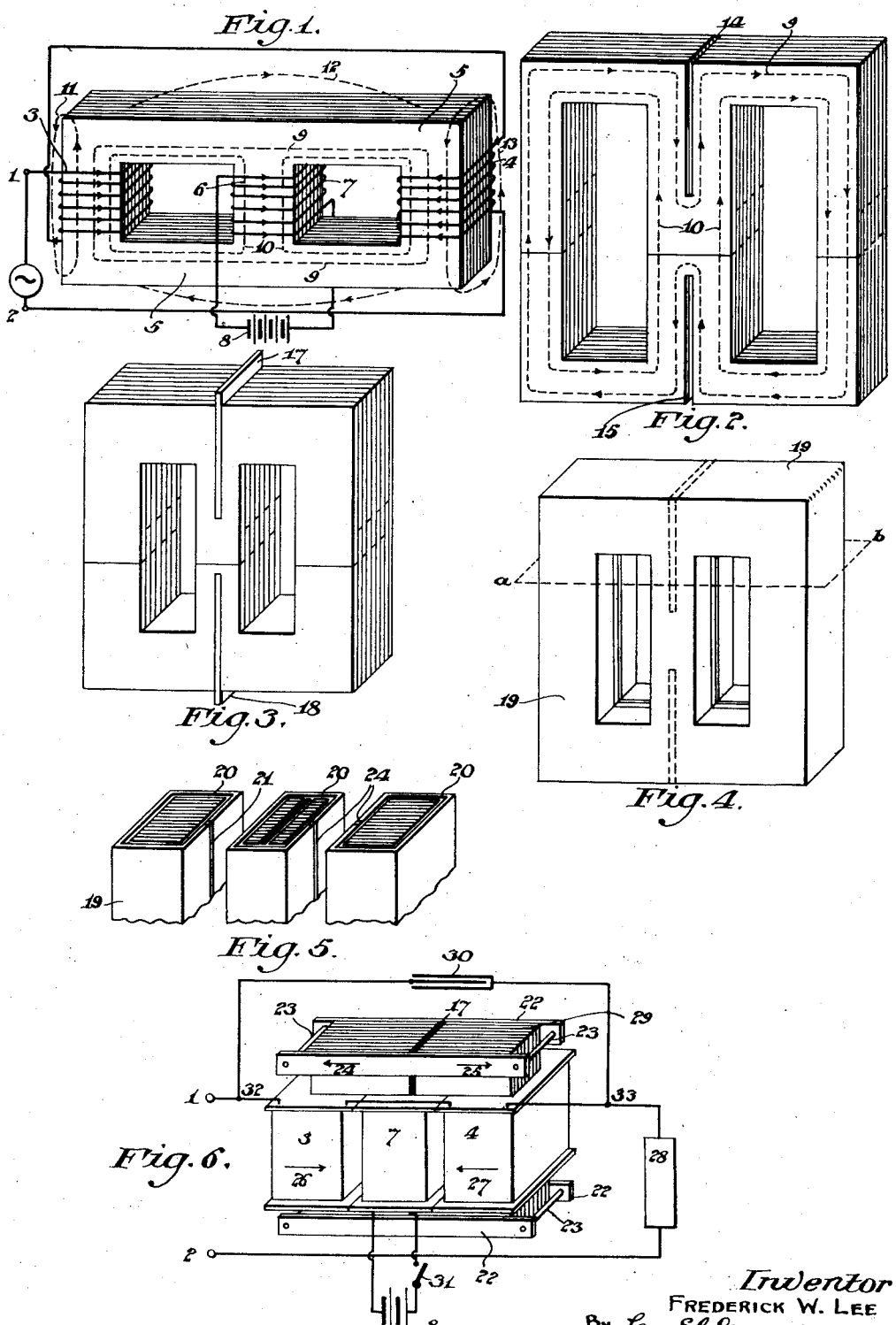
Inventor
FREDERICK W. LEE
By Leon Edelson, ATTORNEY Patented Dec. 29, 1931                                                1,838,315

UNITED STATES PATENT OFFICE

FREDERICK W. LEE, OF BALTIMORE, MARYLAND

MAGNETIC SATURATION CONTROL OF ELECTRIC CIRCUITS

Application filed November 12, 1927. Serial No. 232,816.

This invention relates to the control of alternating currents and potentials by the modification of the reactance and impedance of an alternating current circuit. This change of impedance is caused by the partial saturation of the iron, or other substance of similar qualities, in the alternating magnetic field. This partial saturation is usually accomplished by an auxiliary control circuit, preferably not acted upon by the main alternating magnetic field. This may be accomplished by magnetically shunting two alternating magnetomotive forces of approximately the same intensity, but of opposite polarity. In this way the resultant magnetomotive force on the shunt is always more or less balanced, and no flux enters the shunt path. Under these conditions, any magnetomotive force acting upon a coil on the magnetic shunt will send a flux into the path of the alternating magnetic flux, and thereby reduce the permeability of the iron circuit, thereby decreasing the choking action of the alternating field of flux against the flow of current.

The degree to which this reactance can be altered depends largely upon the decrease of permeability which can be secured in the alternating flux path, and also upon the ability to operate upon the total flux associated with the control mechanism. Any stray flux leaves the residual reactance so much greater. The ideal condition is to reduce the flux, which is linked with the alternating coil, to zero or nearly so, from a condition of high total flux.

It is the purpose of this invention to localize the control of the main alternating flux, to restrict the leakage flux, to balance out the residual flux, and to decrease the time of response. By the time of response is meant the rapidity at which the alternating current circuit comes to the new equilibrium condition after the control current has been altered. The rate at which an alternating current changes depends to a large extent on the resistance, self and mutual induction of its own as well as coupled circuits. By suitable circuit arrangement, this time of response is reduced. It is furthermore desired to use a capacity in conjunction with said alternating control circuit so that the inter-reaction between the two reduces the circuit to resonant condition for certain values of the control current.

A further and more specific object of the invention is to provide a circuit which will permit of the continued and constant operation of a normally intermittently operated lamp in the event that the contacting mechanism which causes the intermittent operation of the lamp should fail to function.

A further object of the invention is to provide a circuit using current derived from the usual power house alternating current supply at the customary voltage, for example 110 volts, which circuit is adapted to supply current for lighting a lamp, in combination with a mechanism which reduces the power supply to the lamp without, however, opening the lamp circuit.

Figure 1 shows a simple type of a magnetically controlled alternating current circuit.

Figure 2 shows the same iron circuit altered, also type of stamping and method of assembly of iron circuit.

Figure 3 shows a further improvement upon the iron circuit.

Figure 4 shows the iron circuit enveloped in a special manner in a conductor.

Figure 5 shows more in detail the construction of Figure 4.

Figure 6 shows the control circuit operating in conjunction with a condenser and several auxilliary circuits.

In Figure 1 is shown a source of alternating potential 1, 2, in the form of a generator, connected to a variable impedance control unit, embodying two alternating current coils 3 and 4, connected electrically in series, and coupled by magnetic circuit 5. The magnetic circuit 5, is magnetically shunted by the iron circuit 6. Upon this iron magnetic circuit 6, is wound a coil 7, which may receive its control current from a battery 8, or some rectifying device operatively associated with the source of alternating potential. The alternating flux from the coils 3 and 4 is shown by 9, and it does not enter into the shunted iron circuit 6. The flux 10, from the magnetizing control 7 also passes into the path of the alternating flux, and decreases the permeability of the magnetic circuit, thereby reducing the reactance, and consequently also the impedance of the circuit from the generator. It is also seen that as the reluctance of the alternating flux path becomes greater, the flux from the coils 3 and 4 will tend to follow relatively low reluctance paths through the air, and avoid the saturated portions of the alternating flux path 9. This leakage flux is shown by the lines 11, 12, 13. All of this flux is equivalent to so much reactance, which cannot be altered by the control current in coil 7.

In Figure 2, the same magnetic circuit is shown in a modified form, the coils having been omitted for the sake of clarity. Here the reluctance of the alternating flux path has been greatly increased by the slots 14 and 15, cut into the laminations in the direction of the shunt path. This compels the alternating flux to follow the path indicated by 9, into the magnetic shunt and out again, without changing the total flux linked with the turns upon coil 7. Coil 7 would normally be on this leg of the iron circuit.

The effect of the control of saturation now does not reside any longer in portions of the magnetic circuit outside of the magnetic shunt, but now can be controlled by the properties of the magnetic shunt.

If the saturation in this shunt is high the alternating flux will traverse the slots 14 and 15. In order to avoid this, the slots 14 and 15 are filled with electrically conducting material as copper, which is shown in Figure 3. The alternating flux, which now would traverse the conducting material, experiences a magnetic reaction, and will tend to divert more of the flux to the control magnetic circuit. This reaction to the flux is caused by eddy currents induced in the conducting material placed in the slot. It would not be necessary to use a plate for this purpose since any closed electric circuit placed in the plane of the metal in the slot will prevent the alternating flux from going through it and also divert it into the shunt path.

In order to prevent the flux 9 from leaving its magnetic circuit by air paths, a further improvement is shown in Figure 4. Here the magnetic circuit is entirely covered with copper, so that any flux which might leave the iron would encounter the eddy current reaction of the copper envelop 19. The copper coating is so arranged that it does not short circuit around the alternating magnetic flux path 9.

This is accomplished in Figure 5, which is a section $a$—$b$ of Figure 4. The copper coating 20, is electrically insulated from the iron, and does not close around the iron magnetic circuits, but leaves an electrically insulating gap in the electric circuits at 21. Any flux which would pass through the copper would react back into the alternating current circuit, as an increased resistance. The amount of this increased resistance is proportional to the resistance offered to the eddy currents in this metal coating.

In Figure 6 the coils 3, 4, and 7 are again shown, with a connection to a source of power 1, 2. Here the alternating current flux is diverted into the shunt path by the copper wedge 17. This wedge also forms part of the eddy current circuits, which restrain the alternating flux, from taking the path 12 of Figure 1. Because the side supports 22 of the laminations are formed of electrically conducting material and are interconnected by the copper wedge 17 and the connecting tie pins 23, there is provided a system of short circuits around the tops and bottoms of the iron yoke which constrain the flux into the regulated path. The effect of these secondary circuits associated with the magnetic saturation control, serve to increase the time of response of the alternating current. The direction of current in the bars is shown by the arrows 24 and 25, respectively. The circuit shows an impedance 28, a lamp for instance, in series with the variable reactor 29 and a condenser 30 shunted across this reactor. The saturation is controlled by a contact mechanism 31, preferably included in a unidirectional current circuit as shown, having its source in a battery 8. The constants of the circuit are so adjusted that, when no current flows in the control coil 7, the lamp is bright, due chiefly to the current through the condenser 30. When the control circuit is closed by switch 31, the reactance of the iron circuit drops to some residual value of flux. By making this residual susceptance, $$\frac{1}{2\Pi fL}$$

equal to $2\Pi fC$ where L is effective residual inductance in henrys, C the capacity in farads, and $f$ the frequency of the system, the combined effect acts as a very low admittance path or high impedance choke, thereby reducing the main alternating current to a very low value.

It is also quite well understood that the greater the voltage upon the variable iron reactance, the higher the iron is saturated and the smaller is the amount of control which can be had from a super-imposed magnetomotive force. By making the impedance 28 have a high positive temperature coefficient the voltage upon the reactance control will grow less with increased saturation due to ratio of change of voltage distribution between the variable iron reactance and the load, thereby increasing the effectiveness of this control.

The operation of the device as shown in Figure 6 may be described as follows:

Alternating current being supplied at the terminals 1 and 2, the lamp 28 is immediately lighted by alternating current passing through the condenser 30 and lamp 28. Some current is also delivered to the lamp 28 through the coils 3 and 4 of the magnetic reactance 5. Direct current of considerably lower voltage than the alternating voltage supplied to the terminals 1 and 2 energizes the direct current coil 7 which is wound upon the legs 6 of the magnetic reactance 5. When the switch 31 is closed the direct current coil 7 is energized whereupon the reactance of the saturation falls. This effect together with that of the capacity 30 causes a high impedance in the circuit through the lamp with the result that the current through the lamp falls to a very low value. Consequently the lamp is dimmed or extinguished if the impedance is high enough. It will be apparent that the lamp lighting circuit is normally closed at all times and that in the event of failure in the contacting mechanism 31 the lamp 28 will continue to be lighted, it being noted that this lamp is dimmed or extinguished only when the switch 31 is closed.

Having now set forth the objects and nature of my invention and constructions embodying the principles thereof, what I claim as new and useful and desire to secure by Letters Patent is:—

1. In an apparatus for controlling the saturation in a magnetic circuit, a magnetic reactance including a magnetic circuit, said reactance being excited by two sources of magnetomotive force, a magnetic shunt for bridging said magnetic circuit, and means arranged at the extremities of the magnetic shunt for increasing the reluctance of the magnetic circuit.

2. In an apparatus for controlling the saturation in a magnetic circuit, a magnetic reactance in which said magnetic circuit is included, a magnetic shunt for bridging said magnetic circuit, and non-magnetic means for changing the direction of the magnetic path at the extremities of the magnetic shunt.

3. In an apparatus for controlling the saturation in a magnetic circuit excited by two sources of alternating magnetomotive force, a magnetic shunt arranged to bridge said magnetic circuit, and means for causing the alternating flux to enter into and leave the magnetic shunt at the same extremity thereof.

4. In an apparatus for controlling the magnetic saturation in a magnetic circuit, said circuit including a pair of alternating current coils adapted for excitation by sources of magnetomotive force, a magnetic shunt for bridging the magnetic circuit, a coil wound on said magnetic shunt, and means for causing the alternating flux to enter into and leave one end of the magnetic shunt.

5. In an apparatus for controlling the saturation of a magnetic circuit, means for establishing a magnetic circuit, a magnetic shunt for bridging said magnetic circuit, and means provided in the ends of the magnetic shunt and traversing the path of the flux circuit for causing the flux to follow a tortuous path into and out of the same end of said magnetic shunt and around the inner end of said last mentioned means.

6. In an apparatus for controlling the saturation of a magnetic circuit, means for establishing a magnetic circuit, a magnetic shunt for bridging said magnetic circuit, said magnetic shunt being provided in one end thereof with an air gap extending across the path of the magnetic flux circuit, said air gap being operative to cause the flux to pass into and out of the same end of the magnetic shunt around the inner edge of the gap whereby to increase the impedance of the magnetic circuit.

7. In an apparatus for controlling the saturation of a magnetic circuit, a magnetic reactance including said magnetic circuit, a magnetic shunt for bridging the magnetic circuit, and means provided in the ends of the magnetic shunt for preventing the flux from by-passing the magnetic shunt without first passing through a portion of the magnetic shunt.

8. In an apparatus for controlling the saturation in a magnetic circuit, a closed magnetic laminated core, through which is adapted to flow a tube of alternating flux, a magnetic shunt bridging the magnetic circuit set up in said core, electrical conducting material disposed in opposite ends of said magnetic shunt for causing the flux to follow a tortuous path through said core, said electrical conducting material being arranged transversely with respect to said laminations, and means for securing said laminations together, said securing means being operative to restrain any flux from leaving the tube of flux flowing through said magnetic core.

9. In a magnetic saturation control apparatus, a magnetic reactance including a magnetic circuit, a magnetic shunt, means for diverting the alternating magnetic flux into said magnetic shunt, and a condenser connected in parallel with said magnetic reactance for neutralizing the effect of the residual flux.

10. In a magnetic saturation control apparatus, a closed magnetic circuit, a magnetic shunt for said circuit, and means for causing the alternating magnetic flux to follow a tortuous path through said shunt.

11. In combination, a source of alternating current supply, a reactor including a magnetic circuit, a device adapted to be operated by alternating current derived from said source, a direct current supply, a magnetic shunt bridging said circuit, means actuated by said direct current supply for influencing the operation of said alternating current device, and means arranged at the extremities of said shunt for increasing the reluctance of said magnetic circuit.

12. In combination, a source of alternating current supply, a reactor including a magnetic circuit, a device adapted to be operated by alternating current derived from said source, a direct current supply, a magnetic shunt circuit, means for causing the flux to follow a tortuous path through said shunt circuit, and means actuated by said direct supply for limiting the passage of alternating current to said device at predetermined intervals.

13. In combination, a reactor including a magnetic circuit, an alternating current circuit for energizing said reactor, a direct current circuit, a device operated directly from said alternating current circuit, the voltage of said direct current circuit being of a predetermined value less than that of the alternating current circuit, a magnetic shunt bridging said magnetic circuit, means for causing the alternating flux to enter into and leave the shunt at the same extremity thereof, and means operated by said low voltage direct current circuit for affecting the operation of said alternating current operated device.

14. In combination, an alternating current circuit, a device operated by said alternating current circuit, a reactance in said circuit between the input and the device, said reactance including a magnetic circuit, a capacity shunted around said reactance, a magnetic shunt for bridging said magnetic circuit, a low voltage direct current circuit, a coil in said direct current circuit, said coil being wound upon said shunt, means operable in said direct current circuit for energizing said coil whereby to vary the operation of said alternating current device, and means in said shunt for increasing the reluctance of the magnetic circuit.

15. In combination, an alternating current circuit, a device operated by said alternating current circuit, a reactance in said circuit between the input and the device, said reactance including a magnetic circuit, a capacity shunted around said reactance, a low voltage direct current circuit, a coil in said direct current circuit, said coil being operatively associated with said reactance to vary the latter, means projecting axially of said coil for increasing the reluctance of said magnetic circuit, and contacts for closing the circuit to said coil whereby the latter may be energized to vary the operation of said device.

16. In combination, an alternating current circuit, a direct current circuit, said alternating current circuit including a lamp and an inductive resistance in series with the lamp, a closed magnetic circuit operatively associated with said inductive resistance, a magnetic shunt for said magnetic circuit, means extending axially of said shunt for increasing the reluctance of said magnetic circuit, means in said direct current circuit for influencing the resistance in said alternating current circuit whereby to lower the flow of current therethrough and consequently dim the light emanating from said lamp.

In testimony whereof, I have hereunto affixed my signature.

FREDERICK W. LEE.